United States Patent [19]
Groeller

[11] Patent Number: 5,877,682
[45] Date of Patent: *Mar. 2, 1999

[54] VEHICULAR LAMP AND METHOD

[75] Inventor: Charles J. Groeller, Allentown, Pa.

[73] Assignee: Mack Trucks, Inc., Allentown, Pa.

[*] Notice: This patent issued on a continued prosecution application filed under 37 CFR 1.53(d), and is subject to the twenty year patent term provisions of 35 U.S.C. 154(a)(2).

[21] Appl. No.: 708,052

[22] Filed: Aug. 30, 1996

[51] Int. Cl.$^6$ ...................................................... B60Q 1/44
[52] U.S. Cl. ...................... 340/479; 340/464; 340/475; 362/541; 362/545
[58] Field of Search ..................................... 340/479, 464, 340/467, 468, 469, 473, 474, 475, 465; 362/235, 236, 800, 61, 80, 545, 541

[56] References Cited

U.S. PATENT DOCUMENTS

| | | | |
|---|---|---|---|
| 2,218,442 | 10/1940 | Thurber | 340/479 |
| 4,034,338 | 7/1977 | Bevilacqua | 340/467 |
| 4,298,869 | 11/1981 | Okuno | 348/82 |
| 4,329,625 | 5/1982 | Nishizawa et al. | 315/158 |
| 4,371,916 | 2/1983 | De Martino | 362/309 |
| 4,660,129 | 4/1987 | Manunta | 362/80 |
| 4,680,678 | 7/1987 | Iwaki | 362/61 |
| 4,700,277 | 10/1987 | Moore | 362/80 |
| 4,733,335 | 3/1988 | Serizawa et al. | 362/80 |
| 4,935,665 | 6/1990 | Murata | 313/500 |
| 4,952,909 | 8/1990 | Woerner et al. | 340/464 |
| 5,093,768 | 3/1992 | Ohe | 362/241 |
| 5,345,218 | 9/1994 | Woods et al. | 340/479 |
| 5,436,809 | 7/1995 | Brassier et al. | 362/61 |
| 5,490,048 | 2/1996 | Brassier et al. | 362/238 |
| 5,684,633 | 11/1997 | Lutz et al. | 359/588 |

*Primary Examiner*—Jeffery A. Hofsass
*Assistant Examiner*—Ashok Mannava
*Attorney, Agent, or Firm*—Rothwell, Figg, Ernst & Kurz, p.c.

[57] ABSTRACT

A light fixture for a vehicle includes a housing with a light-transmitting face divided into two adjacent light-transmitting face portions, which adjacent face portions are separate and discrete first and second face portions. A light-emitting diode (LED) array is positioned in the housing so as to emit light from the first face portion, the LED array including a plurality of adjacent rows of LEDs, each row of LEDs including a plurality of adjacent LEDs. A first electrical connector is provided for connecting the LED array to an electrical system of the vehicle so as to transmit light from the LED array when the vehicle running lights are on, when the vehicle is braking, and for signaling a vehicle turn. A further light source is positioned in the housing so as to emit light from the second face portion, and a second electrical connector is provided for connecting this light source to the electrical system of the vehicle so as to transmit light from the light source when the vehicle is backing up. The invention is also applicable to a method of converting a conventional light fixture for a vehicle into a light fixture as described above.

1 Claim, 9 Drawing Sheets

FIG.8
FIG.9
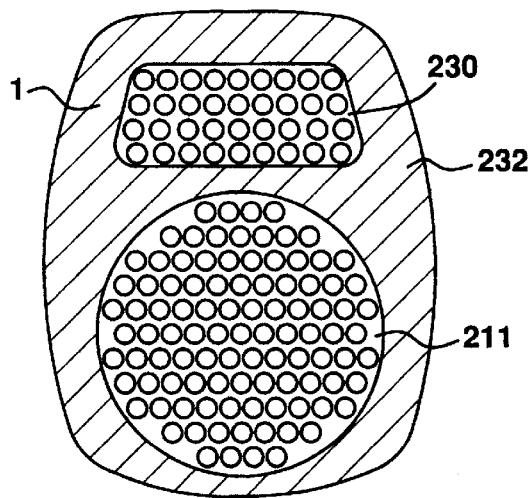
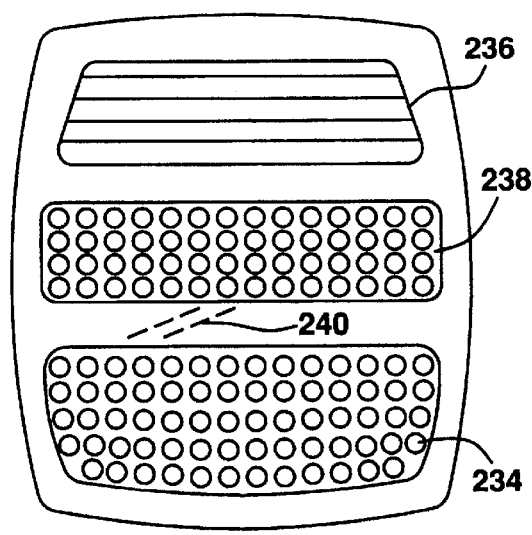

VEHICULAR LAMP AND METHOD

BACKGROUND OF THE INVENTION

1. Field of the Invention

The present invention relates to a light fixture for a vehicle and conversion method.

2. Description of Conventional Art

As illustrated in FIG. 1, conventional multi-compartment vehicular lamps generally include a lens assembly 1 which covers a housing member 2. The lamp housing 2 typically supports a back-up function incandescent lamp 3 (for indicating that the vehicle is backing up) and a stoptaildirectional function incandescent lamp 4 which are inserted in sockets 5 and 6, respectively (a stop function for indicating that said vehicle has stopped, a tail function for illuminating the back of said vehicle, and a directional function for indicating which direction said vehicle is turning). The sockets 5 and 6 are connected by wires 7 and 8, respectively, to a power source within the vehicle (not shown) to provide illumination for a vehicle, as necessary. A suitable connecting means may be employed for connecting housing member 2 to a vehicle, and an electrical connecting member electrically connects the vehicular lamp to an electrical system of a vehicle. Conventional vehicular rear lamps also may include a license plate illuminating lamp, and the face of the lamp may include a reflective surface portion for providing a reflex rear reflector (not shown).

The lens assembly 1 typically includes a back-up function lens 9 which covers the back-up function lamp 3 and a stoptaildirectional function lens 10 which covers the stoptaildirectional function lamp 4. Of course, the position of the lamps may vary, and the number of functions (stop, tail, directional, back-up, license plate) per lens or lamp may vary depending on the type of vehicle.

Shortcomings of this conventional lamp assembly include the short life of the multi-function incandescent bulb, and a somewhat high power consumption with resultant voltage drop.

There remains a need in the art for longer-lived vehicular light fixtures, and methods for converting conventional fixtures to longer-lived fixtures.

SUMMARY OF THE INVENTION

A light fixture for a vehicle comprises a housing with a light-transmitting face divided into two adjacent light-transmitting face portions, which adjacent face portions are separate and discrete first and second face portions. A light-emitting diode (LED) array is positioned in the housing so as to emit light from the first face portion, the LED array including a plurality of adjacent rows of LEDs, each row of LEDs including a plurality of adjacent LEDs. A first electrical connector is provided for connecting the LED array to an electrical system of the vehicle so as to transmit light from the LED array when the vehicle running lights are on and when the vehicle is braking. A light source is positioned in the housing so as to emit light from the second face portion, and a second electrical connector is provided for connecting the light source to the electrical system of the vehicle so as to transmit light from the incandescent source when the vehicle is backing up.

The invention is also applicable to conversion of a conventional light fixture for a vehicle into a light fixture as described above.

BRIEF DESCRIPTION OF THE DRAWINGS

FIG. 8 shows a schematic front view of another embodiment.

FIG. 9 shows a schematic front view of a further embodiment.

DETAILED DESCRIPTION OF THE PREFERRED EMBODIMENTS

In accordance with a method of the present invention, a conventional light fixture for a vehicle having only incandescent light sources can be converted into a vehicular light fixture having an LED light source.

Figure 1:
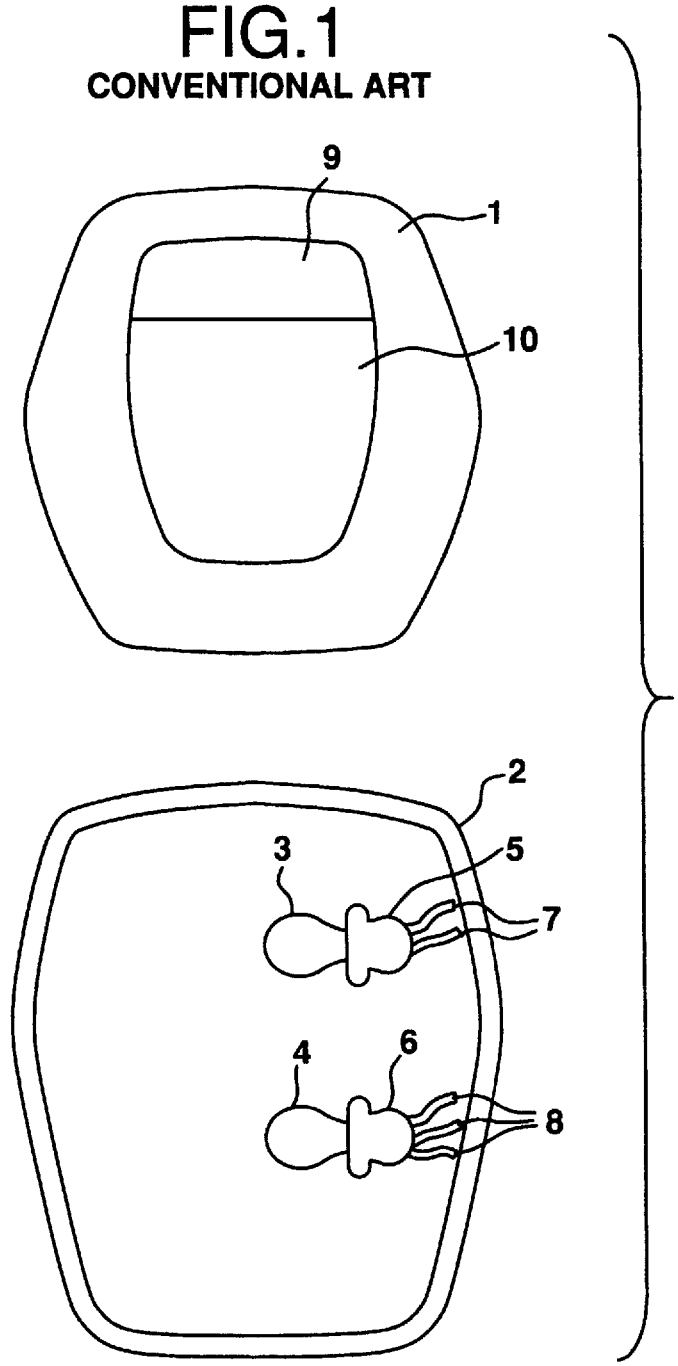
FIG. 1 is a schematic front view of components of a conventional vehicular lamp.

With reference to FIG. 1, this method involves modifying a first light fixture for a vehicle having a housing 2 with a first light-transmitting face 1. Face 1 includes a first lens 10 for transmitting incandescent light, and a first socket 6 for a first incandescent lamp 4 in the housing 2 for connecting the first lamp to an electrical system of the vehicle. Lamp 4 transmits light when the vehicle running lights are on, when the vehicle is braking, and for signaling a vehicle turn. The first light-transmitting face 1 of the conventional lighting fixture has a second lens 9 for transmitting incandescent light, a second socket 5 for a second incandescent lamp 3 in the housing 2, for connecting the second lamp 3 to the electrical system of the vehicle, to transmit light when the vehicle is backing up.

Figure 6:
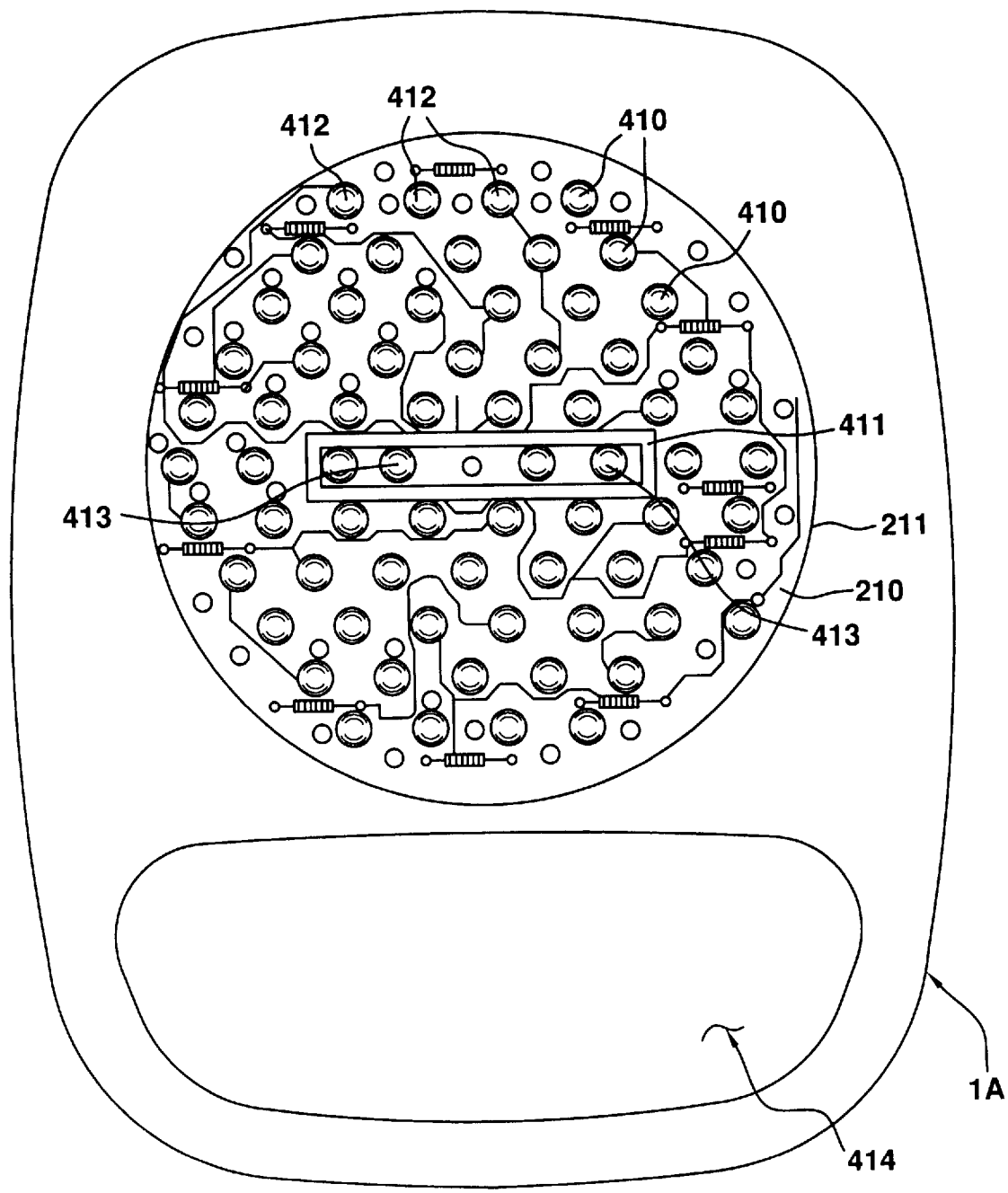
FIG. 6 shows a schematic front view of one embodiment of the present invention as fully assembled with the lens assembly connected to the lamp housing.
Figure 7:
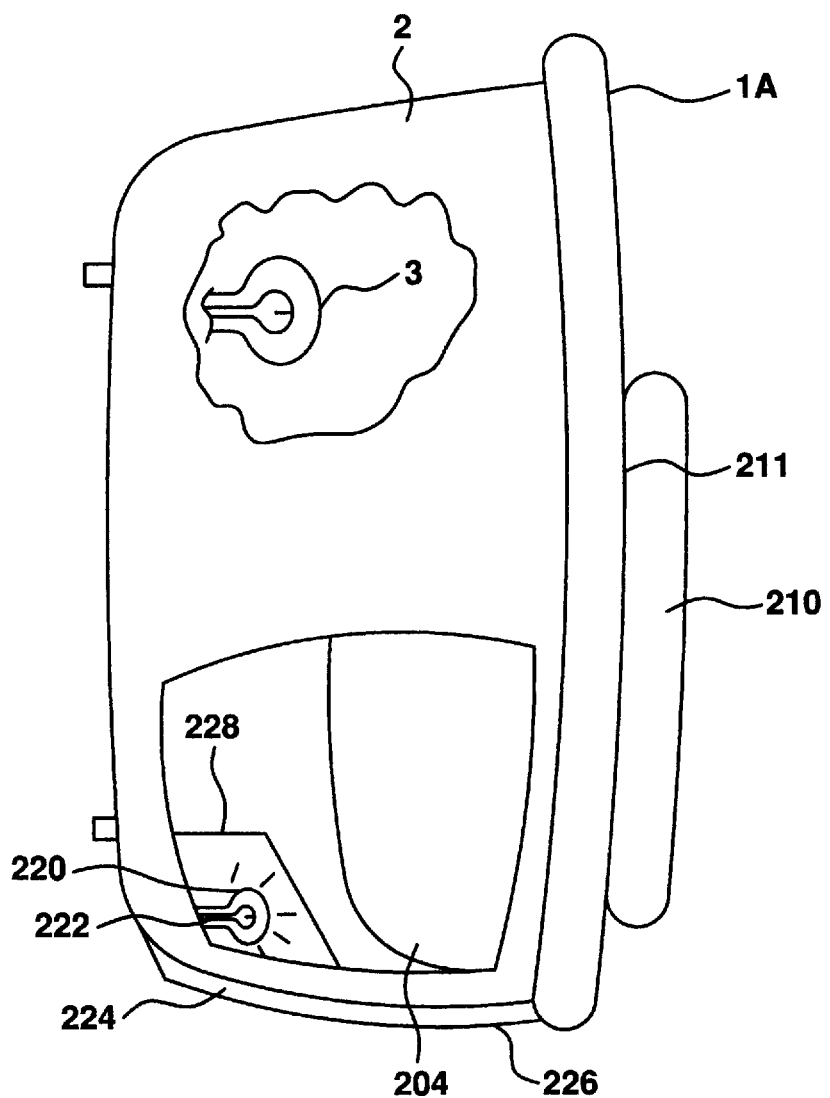
FIG. 7 shows a schematic side view of one embodiment of the present invention with the lens assembly connected to the lamp housing.

The first socket 6 and first light-transmitting face 1 are replaced with a second light-transmitting face 1A and a light-emitting diode (LED) array 211, shown in FIG. 6. The second light-transmitting face 1A is divided into only two adjacent light-transmitting face portions, which adjacent face portions are separate and discrete first and second face portions 210 and 414, respectively. The second light-transmitting face 1A is connected to housing 2, as shown in FIG. 7. The LED array 211 is positioned in housing 2 so as to emit light from the first face portion 210, the LED array including a plurality of adjacent rows of LEDs 410, each row of LEDs including a plurality of adjacent LEDs 412, as shown in FIG. 6. A first electrical connector 209 is provided for connecting the LED array to the electrical system of the vehicle so as to transmit light from the LED array lamp 204 when the vehicle running lights are on, when the vehicle is braking, and for signaling a vehicle turn. See FIG. 4. The second incandescent light source 3 emits light from the second face portion 414 when the vehicle is backing up.

Figure 2:
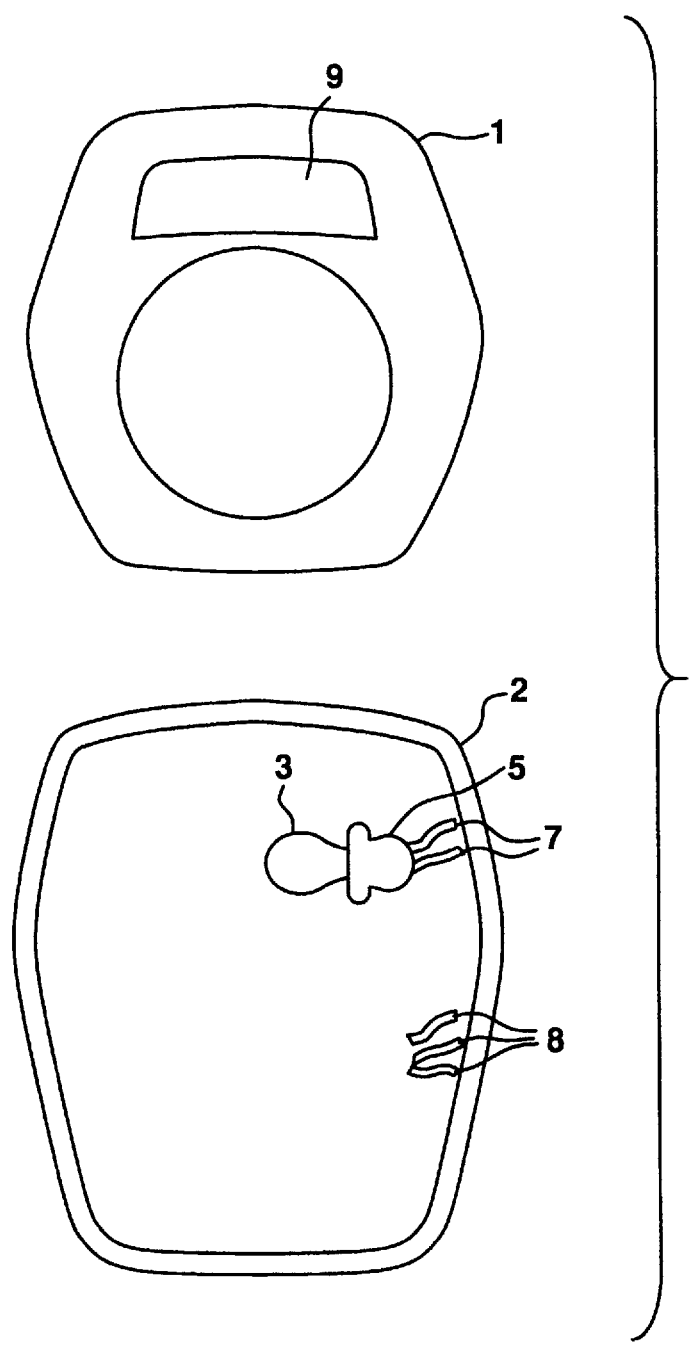
FIG. 2 shows a schematic front view of the first step in producing a preferred embodiment of the present invention, with a conventional lens used for stoptaildirectional functions removed and the corresponding incandescent lamp removed from its socket.

As shown in FIGS. 1 and 2, one method of producing the present invention first involves removing the conventional stoptaildirectional function lens 10, the conventional stoptaildirectional function incandescent lamp 4, and socket 6 from a conventional vehicular lamp.

Figure 4:
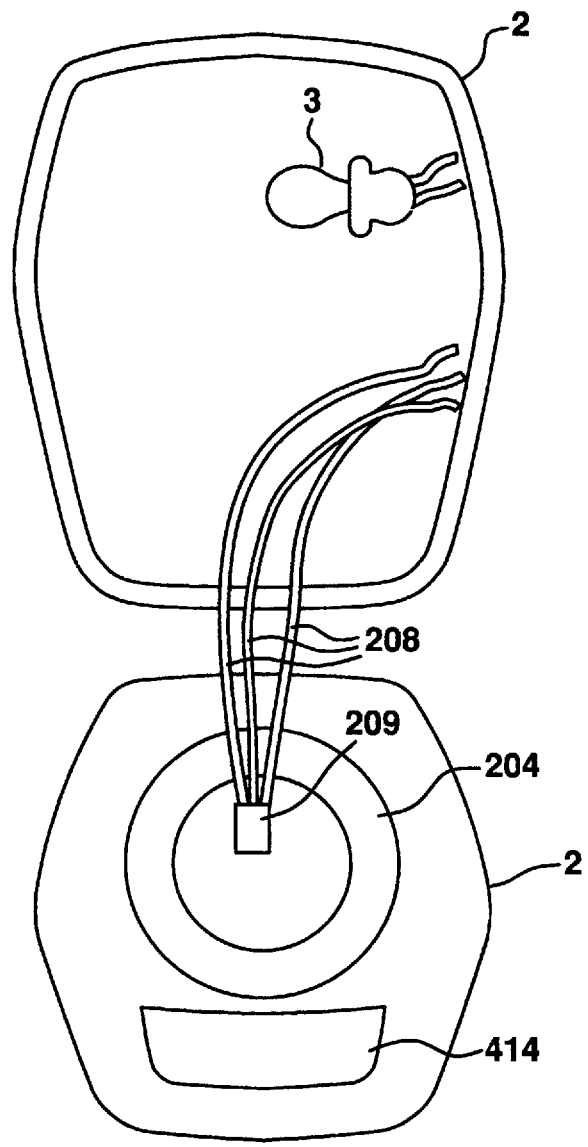
FIG. 4 shows a schematic front view of how, in accordance with a preferred embodiment of the present invention, an LED stoptaildirectional lamp is connected to the lamp housing.
Figure 5:
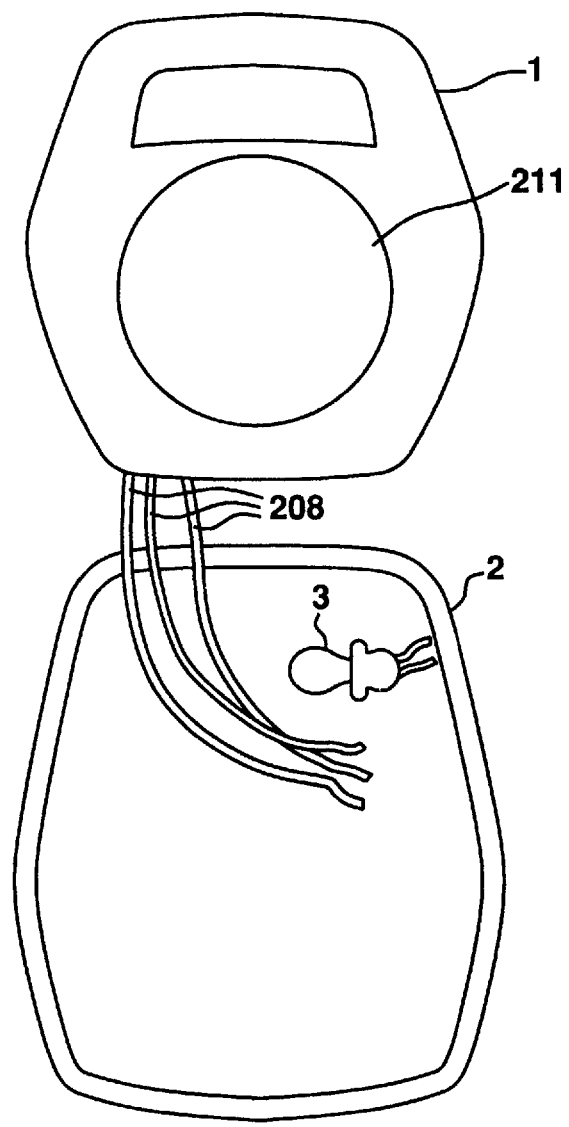
FIG. 5 shows a schematic view opposite that of FIG. 4 of the LED lamp being connected to the lamp housing according to one embodiment of the present invention.

Next, as shown in FIG. 4, a stoptaildirectional function LED lamp 204 is connected to wire 208 via an interface electrical connector 209 and a stoptaildirectional function LED lens 211 is inserted into face 1 to cover the LED lamp 204. FIG. 5 shows the same from the opposite side.

Figure 3:
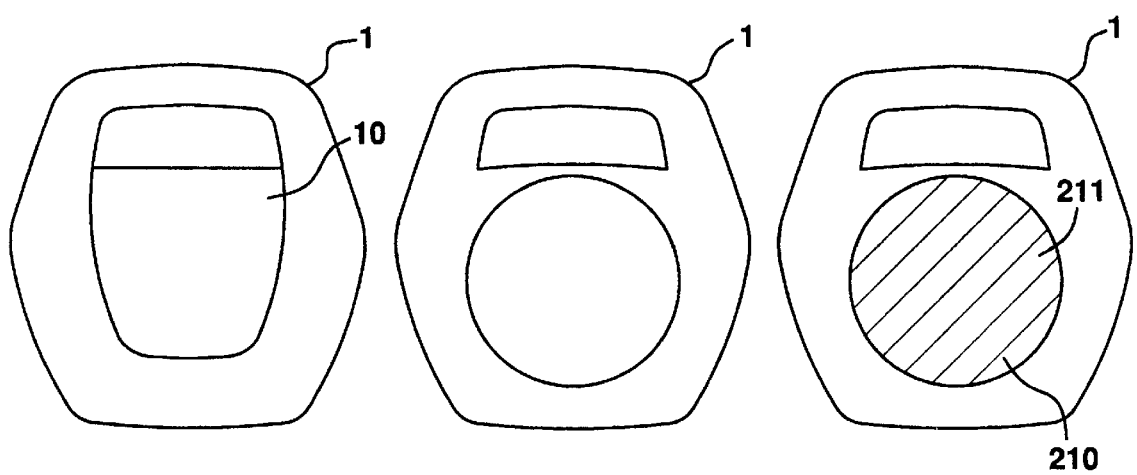
FIG. 3 shows a schematic front view of how, in accordance with a preferred embodiment of the present invention, the lens assembly is changed from having a conventional stoptaildirectional lens 10 as shown in FIG. 3(a), to the conventional lens 10 being removed as shown in FIG. 3 (b), and finally, to a lens 210 being placed into lens 1 as shown in FIG. 3(c).

FIG. 3 shows a sequential front view of how, in accordance with the preferred embodiment of the present invention, face 1 is changed from having a conventional stoptaildirectional function lens 10 as shown in FIG. 3(a), to the conventional lens 10 being removed as shown in FIG. 3(b), and finally, to a stoptaildirectional function LED lens 210 being connected to face 1 as shown in FIG. 3(c).

FIG. 6 shows the present invention as fully assembled with the face 1A for covering and connected to the lamp housing 2, while FIG. 7 shows a side view of the same.

The LED array shown in FIG. 6 is a substantially circular array. In this embodiment, the LED array includes a plurality of adjacent rows 410 of red LEDs, each row 410 including a plurality of adjacent red LEDs 412. This embodiment further includes a partial row 411 of four red LEDs 413. In accordance with one embodiment, all of LEDs 412 and 413 operate continuously when the vehicle running lights are on, but not always at the same intensity. In this embodiment, partial row 411 of LEDs 413 operate at full intensity continuously when the vehicle running lights are on. The remaining LEDs 412 are connected with the vehicle's electrical system so as to operate at partial intensity when only the vehicle running lights are on, and operate at full intensity only when the vehicle is braking andor signalling a turn. In accordance with this embodiment, the turn signal function of LED rows 411 override the stop function when the vehicle is simultaneously signaling a turn and braking. However, the LED configuration may vary with lamp size or lens design in order to meet a desired light output.

As shown in FIG. 6, the second face portion can be a substantially linearly elongate area 414 for transmitting substantially white light from the incandescent light source when the vehicle is backing up.

FIG. 7 shows an embodiment of the invention wherein housing 2 contains a second light source 220 and an electrical connector 222 for connecting the second light source to the electrical system of the vehicle. Light source 220 operates at all times when the vehicle running lights are on and directs illumination through a transparent window 224 in a sidewall portion 226 of housing 2 so as to illuminate an adjacent license plate of the vehicle. A reflector 228 is provided in housing 2 for directing the light from source 220 through the side portion 226 of housing 2. In the embodiment shown, light source 220 is an incandescent light source.

Another embodiment of the invention is shown in FIG. 8, which includes an LED array 211 for transmitting light when the vehicle running lights are on, when the vehicle is braking and for signaling a vehicle turn. According to this embodiment, a substantially white LED array 230 is provided as the light source for transmitting light when the vehicle is backing up. FIG. 8 also shows an embodiment of the invention wherein face 1 includes a reflective surface 232 for reflecting external light which impinges on the reflective surface, thereby providing a reflex rear reflector.

FIG. 9 shows still another embodiment of the invention which includes a red LED array 234 for transmitting light when the vehicle running lights are on and when the vehicle is braking, a light source 236, which can be an incandescent source or an LED source, for transmitting light when the vehicle is backing up, and a third face portion 238 comprising an amber LED array for signaling a vehicle turn. FIG. 9 schematically shows a third electrical connector 240 for connecting the amber LED array 238 to the electrical system of the vehicle for activation of the amber LED array when signaling a vehicle turn.

Figure 10:
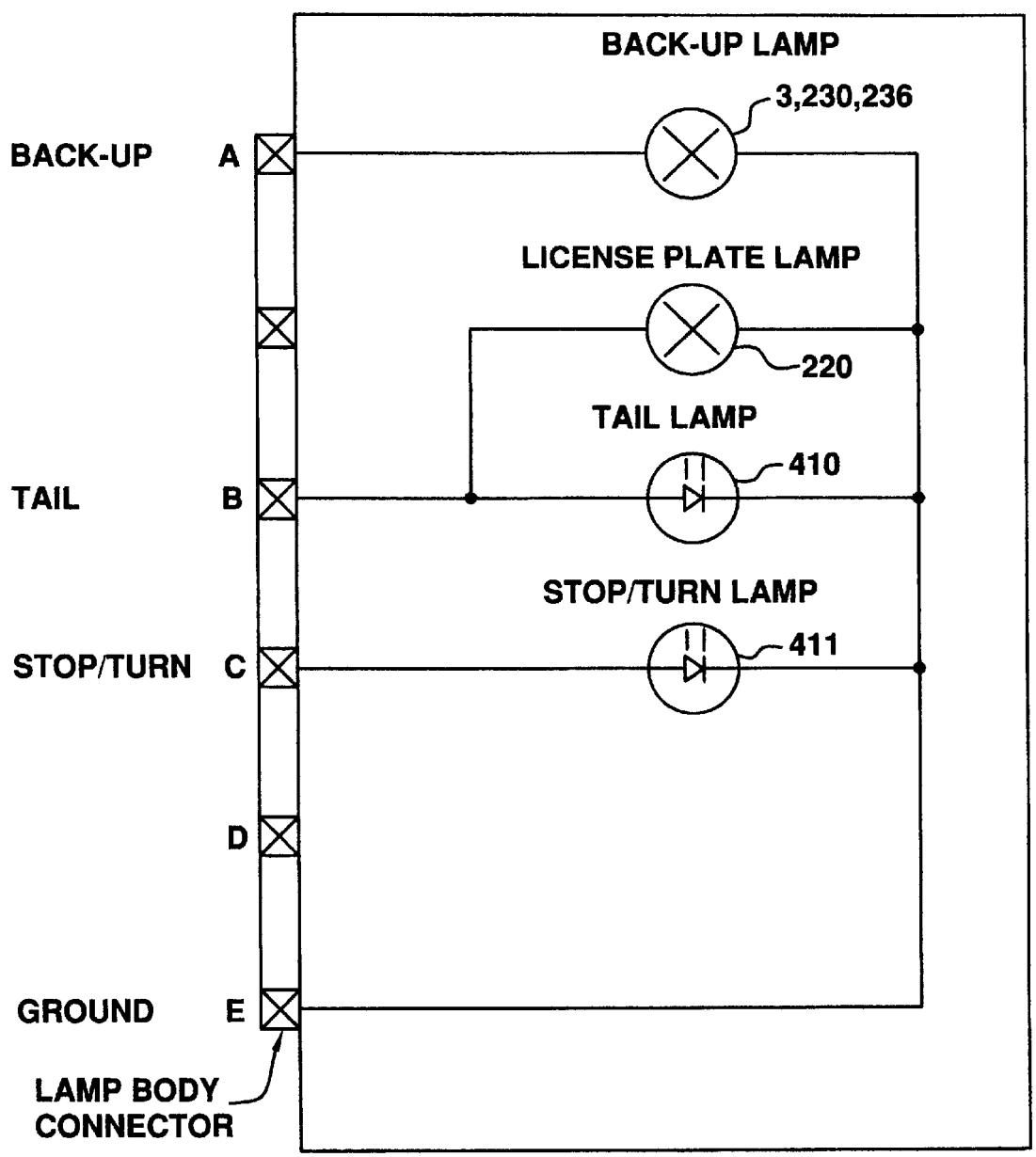
FIG. 10 shows a schematic view of electrical wiring used in one embodiment of the present invention.

FIG. 10 provides a schematic view of electrical wiring which can be used to connect to a back-up light source 3, 230, 236, license plate lamp 220, tail lamp LEDs 410, and stopturn LEDs 411, in accordance with the present invention.

The present invention provides a light fixture for a vehicle that incorporates a long-lived LED array for the main vehicle rear light functions. The invention also provides a method for converting a conventional all-incandescent vehicle light fixture into a light fixture including a long-lived LED array for the vehicle's main rear light functions. Alternatively, the inventive fixture can be assembled from all new parts.

The invention having been thus described, it will be apparent to those skilled in the art that the same may be varied in many ways without departing from the spirit and scope of the invention. Any and all such modifications are intended to be included within the scope of the following claims.

What is claimed is:

1. A method of converting a lighting fixture for a vehicle, said method comprising:

providing a lighting fixture for a vehicle, having a discrete housing structure with a first light-transmitting face including a first lens for transmitting incandescent light, a first socket for a first incandescent lamp in said housing for connecting the first lamp to an electrical system of the vehicle to carry out a first set of lighting functions including transmitting light when the vehicle running lights are on, when the vehicle is braking, and for signaling a vehicle turn, the first face having a second lens for transmitting incandescent light, a second socket for a second incandescent lamp in said housing for connecting the second lamp to the electrical system of the vehicle to carry out a further lighting function to transmit light when said vehicle is backing up;

said method further comprising removing and replacing said first socket and said first light-transmitting face with a single, unitary assembly to form a converted lighting fixture;

said unitary assembly comprising a single second light-transmitting face which is connected to said discrete housing structure for completely covering said discrete housing structure, said single second face being divided into two adjacent light-transmitting face portions, which adjacent face portions are separate and discrete first and second face portions of said single second face;

said unitary assembly further comprising a light-emitting diode (LED) array positioned in said discrete housing structure so as to emit light from the first face portion, the LED array including a plurality of adjacent rows of LEDs, each row of LEDs including a plurality of adjacent LEDs;

wherein a first electrical connector is provided for connecting the LED array to the electrical system of the vehicle so as to carry out lighting functions in said converted lighting fixture which correspond to said first set of lighting functions, including transmitting light from the LED array when the vehicle running lights are on, when the vehicle is braking, and for signaling a vehicle turn; and wherein a second electrical connector is provided for connecting a second light source to the electrical system of the vehicle, the second light source being positioned in said discrete housing structure so as to carry out another lighting function in said converted lighting fixture corresponding to said further lighting function, and emit light from the second face portion when the vehicle is backing up.

\* \* \* \* \*